United States Patent
Li et al.

(10) Patent No.: US 11,361,116 B2
(45) Date of Patent: Jun. 14, 2022

(54) MODELING OF BLENDS ON BOSSES AND FACES OF A SOLID MODEL POCKET

(71) Applicants: SIEMENS PRODUCT LIFECYCLE MANAGEMENT SOFTWARE INC., Plano, TX (US); Xiuchang Li, Shanghai (CN); Hui Qin, Shanghai (CN); Feng Yu, Irvine, CA (US)

(72) Inventors: Xiuchang Li, Shanghai (CN); Hui Qin, Shanghai (CN); Feng Yu, Irvine, CA (US)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 941 days.

(21) Appl. No.: 15/775,562

(22) PCT Filed: Nov. 11, 2015

(86) PCT No.: PCT/CN2015/094346
§ 371 (c)(1),
(2) Date: May 11, 2018

(87) PCT Pub. No.: WO2017/079927
PCT Pub. Date: May 18, 2017

(65) Prior Publication Data
US 2018/0357336 A1 Dec. 13, 2018

(51) Int. Cl.
*G06F 30/00* (2020.01)
*G06F 30/17* (2020.01)
*G06F 119/18* (2020.01)

(52) U.S. Cl.
CPC .............. *G06F 30/00* (2020.01); *G06F 30/17* (2020.01); *G06F 2119/18* (2020.01)

(58) Field of Classification Search
CPC ....... G06F 30/00; G06F 30/17; G06F 2119/18
See application file for complete search history.

(56) References Cited

U.S. PATENT DOCUMENTS 10,061,299 B2 * 8/2018 Herrman ............ G05B 19/4097
2002/0008700 A1    1/2002 Fuki
(Continued)

FOREIGN PATENT DOCUMENTS

CN    102067130 A    5/2011
CN    102203781 A    9/2011
(Continued)

OTHER PUBLICATIONS

Toby Schnaars; "An Advanced Breakdown of the Solidwords Fillet Feature Tool"; Technology for Design and Engineering (Year: 2016).*
(Continued)

*Primary Examiner* — Rehana Perveen
*Assistant Examiner* — Nupur Debnath
(74) *Attorney, Agent, or Firm* — Lempia Summerfield Katz LLC

(57) ABSTRACT

Methods for accurately modeling blends in a solid model and corresponding systems and computer-readable mediums. A method includes receiving a solid model including a plurality of faces and bosses, and identifying a pocket from the plurality of faces, including one or more pocket edges to be blended. The method includes performing an analyze pockets process on the pocket and identifying at least one of a tool type, a tool method, or a tool dimension for machining the pocket. The method includes performing a blend pocket process to model blends on the pocket edges and adding blends to the solid model at the pocket edges in a predefined order, according to the blend pocket analysis, to produce a modified solid model. The method includes displaying the modified solid model by the data processing system.

18 Claims, 14 Drawing Sheets

(56) References Cited

U.S. PATENT DOCUMENTS

| | | | |
|---|---|---|---|
| 2009/0259442 A1* | 10/2009 | Gandikota | G06F 30/00 703/1 |
| 2010/0179788 A1 | 7/2010 | Santina et al. | |
| 2010/0272559 A1* | 10/2010 | Propheter-Hinckley | B21D 53/84 415/173.1 |
| 2011/0282632 A1* | 11/2011 | Rameau | G06T 17/10 703/1 |
| 2012/0221297 A1 | 8/2012 | Nanson | |
| 2014/0219588 A1* | 2/2014 | McCulfor | F16C 17/12 384/26 |
| 2014/0228997 A1* | 8/2014 | Phillips | G05B 19/4097 700/182 |
| 2015/0269284 A1 | 9/2015 | Mattson | |
| 2015/0301519 A1* | 10/2015 | Cooper | F01D 5/147 700/98 |
| 2016/0078151 A1* | 3/2016 | Zhao | G06F 30/17 703/1 |
| 2016/0101474 A1* | 4/2016 | Abrahamsen | G05B 19/19 |

FOREIGN PATENT DOCUMENTS

| | | |
|---|---|---|
| CN | 103392180 A | 11/2013 |
| JP | 2001350803 A | 12/2001 |
| JP | 2008033430 A | 2/2008 |
| WO | 2008012640 A1 | 1/2008 |
| WO | 2014186984 A1 | 11/2014 |
| WO | WO2015058152 A1 | 4/2015 |

OTHER PUBLICATIONS

Ryan Navarro; "Understanding Open Pocket and Boss Features in Camworks 2.5 Axis" (Year: 2016).*

H. Zhu, C. Menq; "B-Rep model simplification by automatic fillet/round suppressing for efficient automatic feature recognition"; https://www.sciencedirect.com/science/article/pii/S0010448501000562 (Year: 2002).*

A Hatna, R J Grieve and P Broomhead; "Surface blending for machining purposes: a brief survey and application for machining compound surfaces"; IMechE 2001; Proc Instn Mech Engrs vol. 215 Part B (Year: 2001).*

PCT International Search Report for corresponding PCT/CN2015/094346, filed on Nov. 11, 2015.

Japanese Office Action for related Japanese Application No. 2017-505506 dated May 27, 2019, with English translation.

European Search Report for European Patent Application No. 15908057.1-1224 / 3323062 dated Mar. 6, 2019.

Chinese Office Action for Chinese Application No. 2015800823980.0 dated Oct. 10, 2020.

European Search Report for European Application No. 15908057.1-1224 dated Sep. 9, 2020.

* cited by examiner

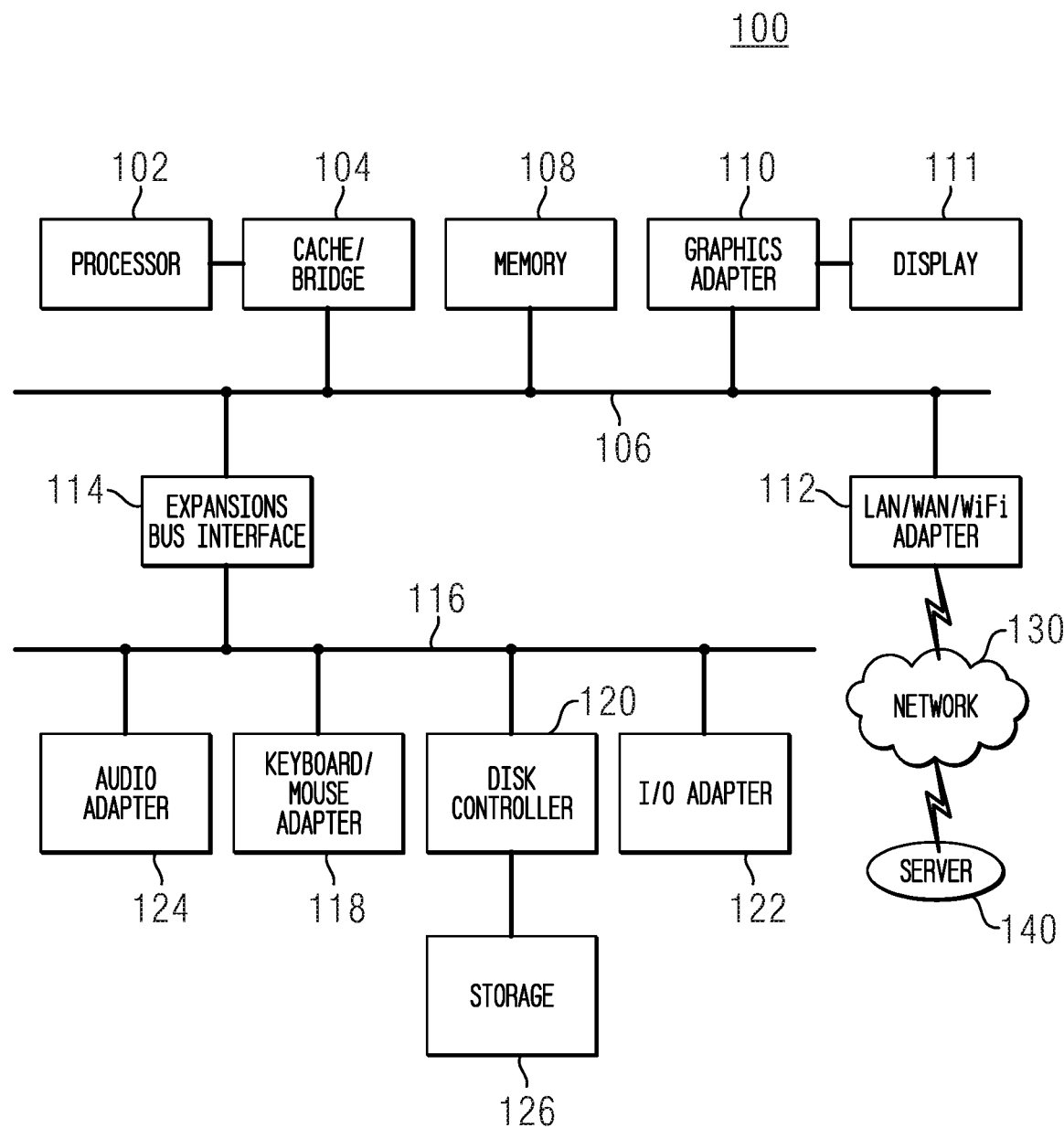

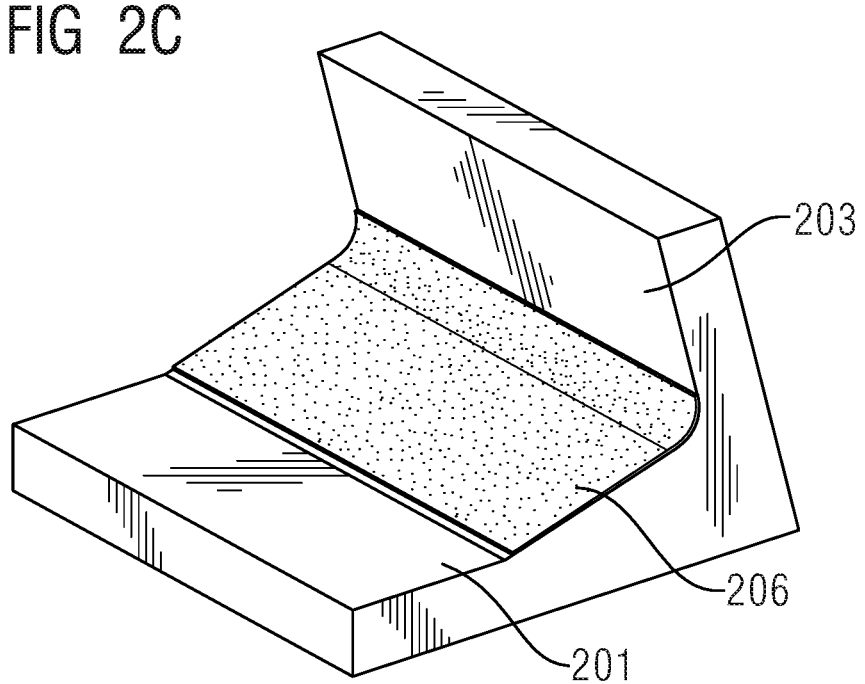
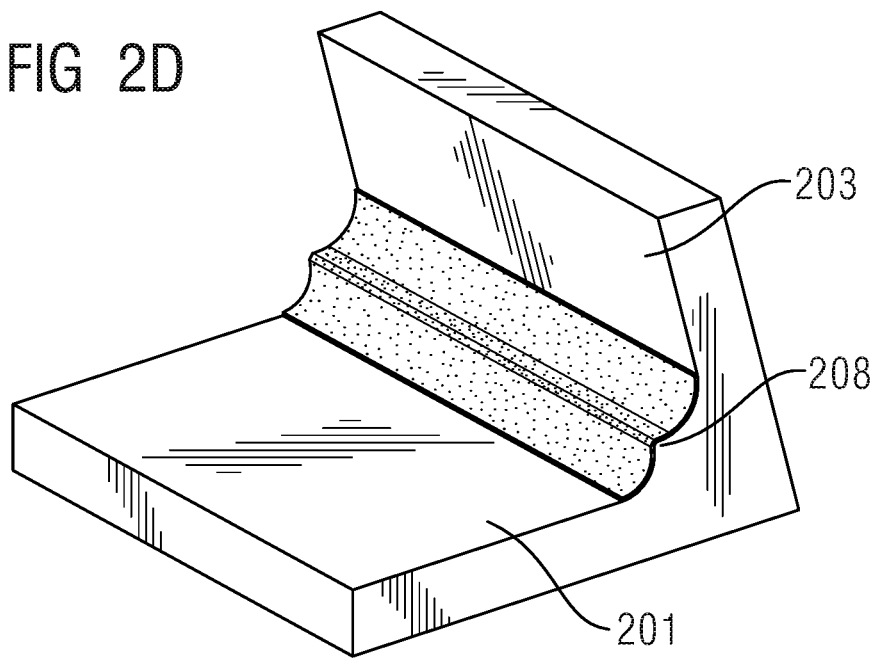

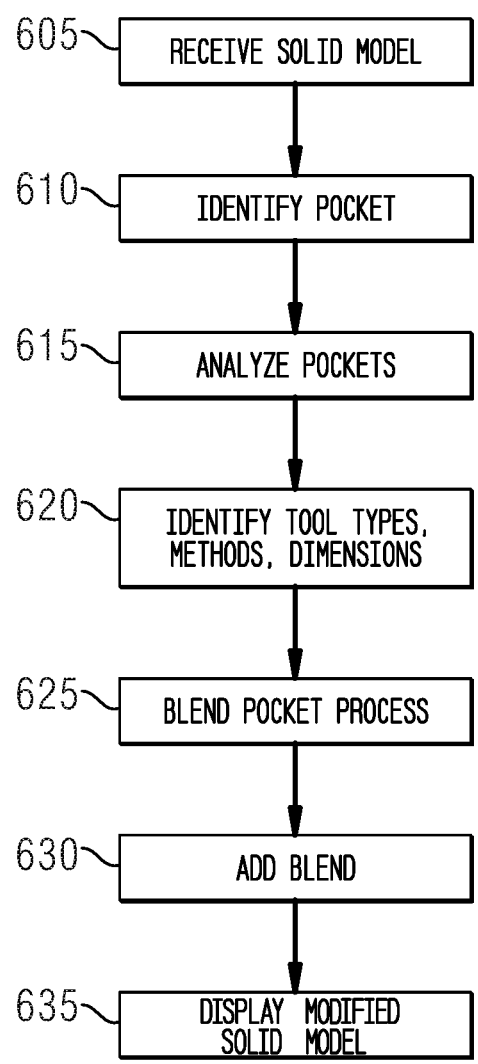

MODELING OF BLENDS ON BOSSES AND FACES OF A SOLID MODEL POCKET

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for accurately modeling blends in a solid model and corresponding systems and computer-readable mediums. A method includes receiving a solid model including a plurality of faces and bosses, and identifying a pocket from the plurality of faces, including one or more pocket edges to be blended. The method includes performing an analyze pockets process on the pocket and identifying at least one of a tool type, a tool method, or a tool dimension for machining the pocket. The method includes performing a blend pocket process to model blends on the pocket edges and adding blends to the solid model at the pocket edges in a predefined order, according to the blend pocket analysis, to produce a modified solid model. The method includes displaying the modified solid model by the data processing system.

The foregoing has outlined rather broadly the features and technical advantages of the present disclosure so that those skilled in the art may better understand the detailed description that follows. Additional features and advantages of the disclosure that will be described hereinafter form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 illustrates a block diagram of a data processing system in which an embodiment can be implemented;

FIGS. 2A-2F illustrate examples of solid-model pockets;

FIG. 6 illustrates a flowchart of a process in accordance with disclosed embodiments.

DETAILED DESCRIPTION

Figure 2A:
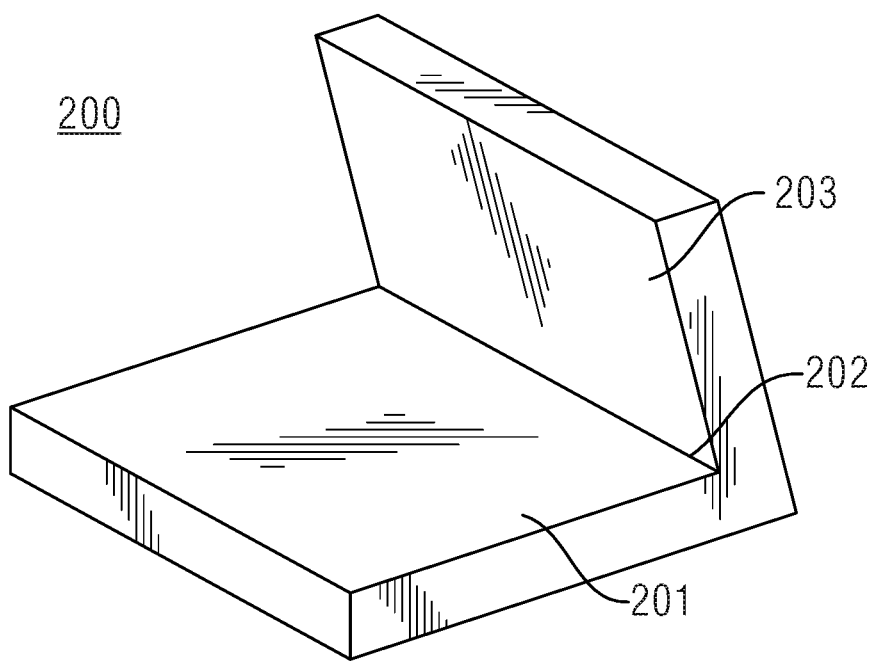

FIGS. 1 through 8E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In computer solid modeling, normal blending commands do not consider all the tooling that could be used to create a machined pocket, and therefore do not always model the blends as they would be manufactured. That is, the pocket and its blends may be visualized in a computer aided drafting (CAD) or PDM system in a manner that does not accurately reflect how the workpiece will or should be actually machined. Disclosed embodiments provide systems and methods that enable users to easily and more accurately model blends on the internal edges of pockets, i.e., blends that will better represent the actual pocket geometry as it will be machined. Further, disclosed embodiments also enables users to accurately model all would-be-machined blends for the category of boss clusters associated with multiple walls in a solid model pocket in one step, that otherwise will fail, get a wrong result, or take 10-20 steps of manual attempts, among numerous other disadvantages. Disclosed embodiments significantly improve the productivity and increase the success rate for manufactures, among numerous other advantages.

Note that while this disclosure uses the term "blending," many of those of skill in the art use the terms 'filleting' or 'filleting and rounding' to describe the softening of sharp edges. This disclosure may use these terms interchangeably, and the disclosed techniques apply regardless of the specific term used for this concept. As used herein, a "pocket" is defined as at least one floor face and one or more wall faces in a solid model and its corresponding machined workpiece. Note that "floor" and "wall" are not intended to imply limitations with respect to the orientation of these features; these terms refer to any faces connected by one or more edges.

FIG. 1 depicts a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In a CAD solid modeling system, blends are usually applied to edges or between connecting faces of a pocket, without regard for particular geometric details of the whole pocket, or the tools and methods used to manufacture the pocket. For some cases, this results in a solid model that does not accurately represent the final physical pocket as it will be manufactured.

Manufacturers may take extraordinary steps to machine the pocket as it is modeled, even though the design would be tolerant of changes that would be easier and less expensive to manufacture. The ability to model the blends as they would be machined, as disclosed herein, reduces or eliminates this unnecessary work and expense in manufacturing.

Shallow pocket walls cause another problem in some systems when they are blended without consideration of how they will be machined. For a blend that has a radius larger than the pocket depth, the modeler may have to adjust the dimensions of the pocket so that the designed edge locations are correct after blending.

An additional problem of other systems is that if the model does not represent the final part, accurate weight estimates cannot be made using the model. This is an important issue for products where weight is a critical factor in product performance.

FIGS. 2A-2F illustrate examples of solid-model pockets.

FIG. 2A illustrates a solid model 200 having a pocket with an angled wall formed by faces 201 (floor) and 203 (wall). Note that there is no blending or other softening of the sharp edge 202 and acute angle between the base and the wall.

Figure 2B:
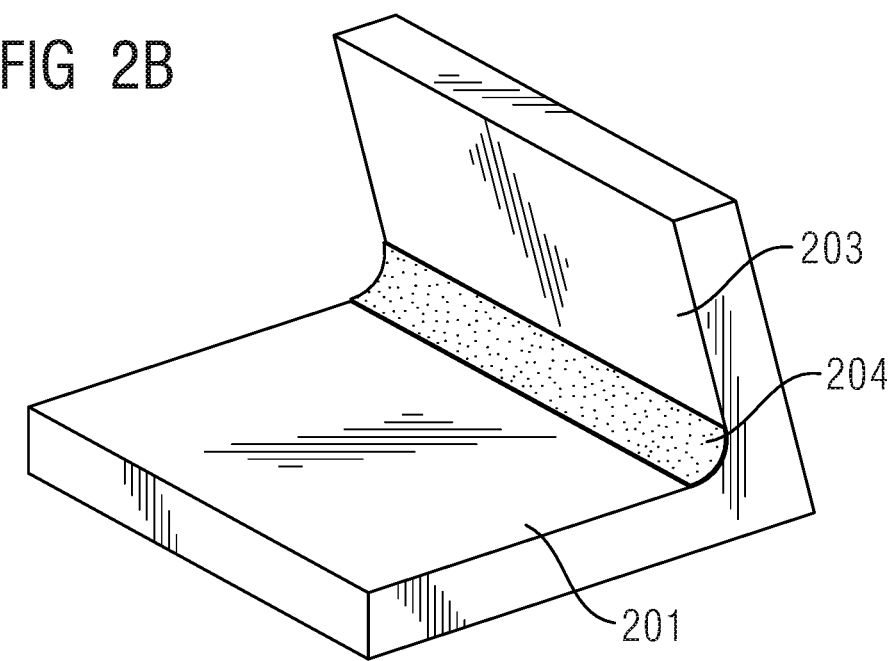

FIG. 2B illustrates a pocket with a modeled blend 204 using conventional CAD blending and visualization techniques. In actual manufacturing, however, this blend could be machined only by using a spherical mill. An end mill is the preferred tool for machining a pocket, and if an end mill were used for machining this pocket, it could produce a number of different results.

FIG. 2C illustrates one possible result of machining the pocket of FIG. 2A using an end mill. Note that the resulting manufactured blend 206 is much shallower than presented using conventional blending and visualization.

FIG. 2D illustrates another possible result of machining the pocket of FIG. 2A using an end mill. Note that the resulting manufactured blend is shallower than presented using conventional blending and visualization and includes an irregular shape 208.

Figure 2E:
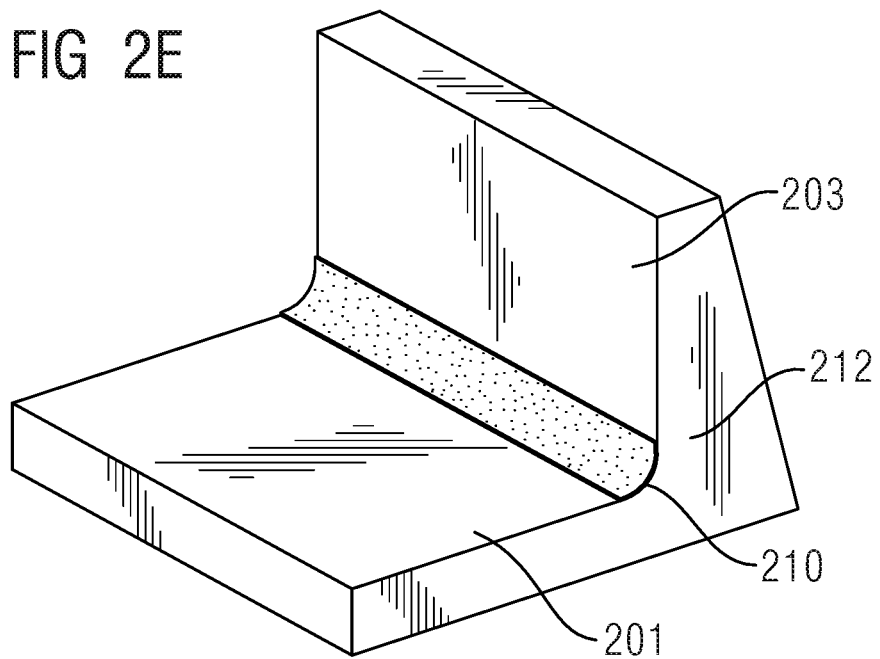

FIG. 2E illustrates another possible result of machining the pocket of FIG. 2A using an end mill. Note that to properly produce the blend 210, the wall 212 has been moved to a vertical position.

Figure 2F:
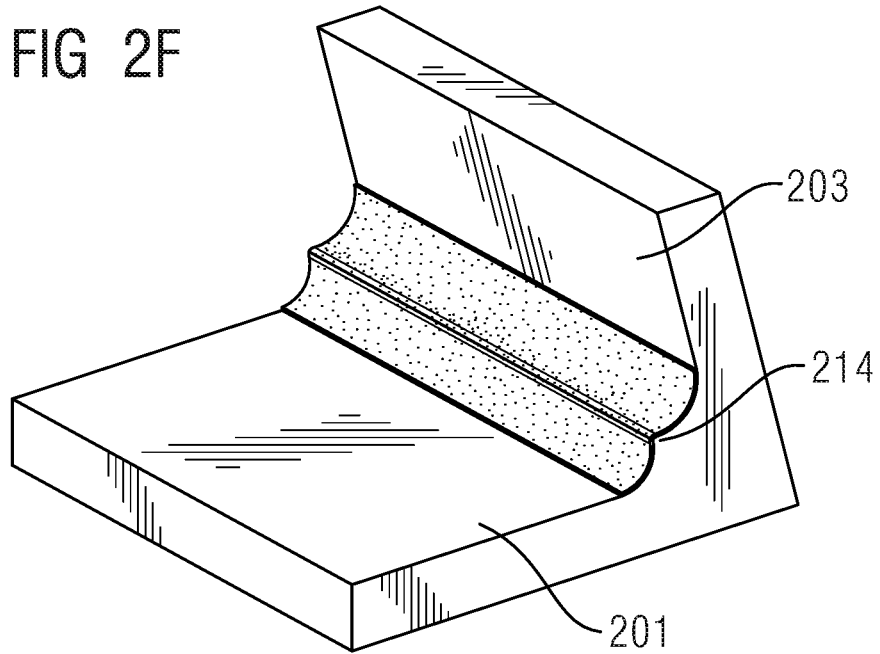

FIG. 2F illustrates another possible result of machining the pocket of FIG. 2A using an end mill. Note that the resulting manufactured blend is shallower than presented using conventional blending and visualization and includes an irregular shape 214.

Figure 3A:
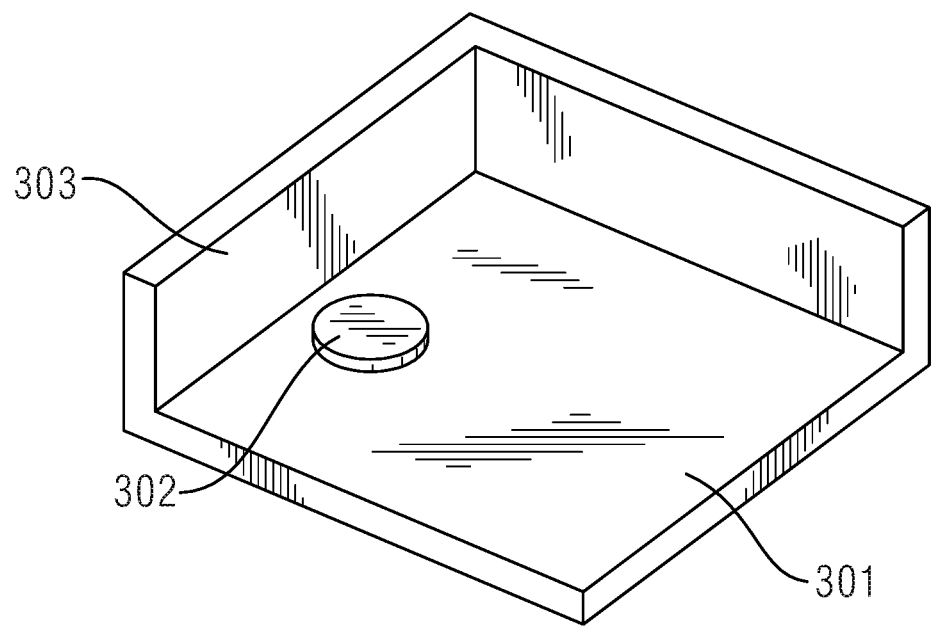
FIGS. 3A-3C illustrate examples of solid-model pockets with an additional feature.
Figure 3B:
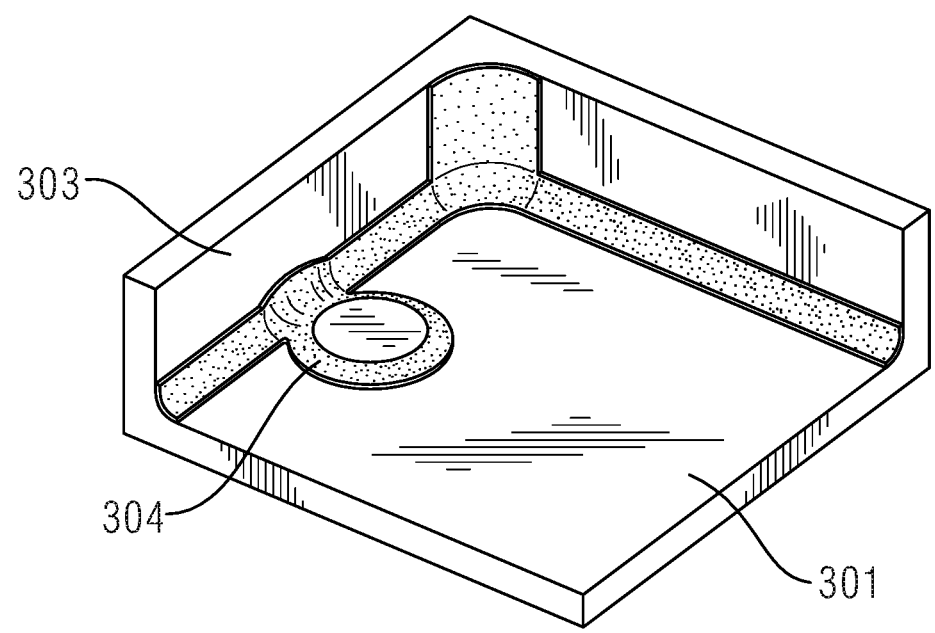
Figure 3C:
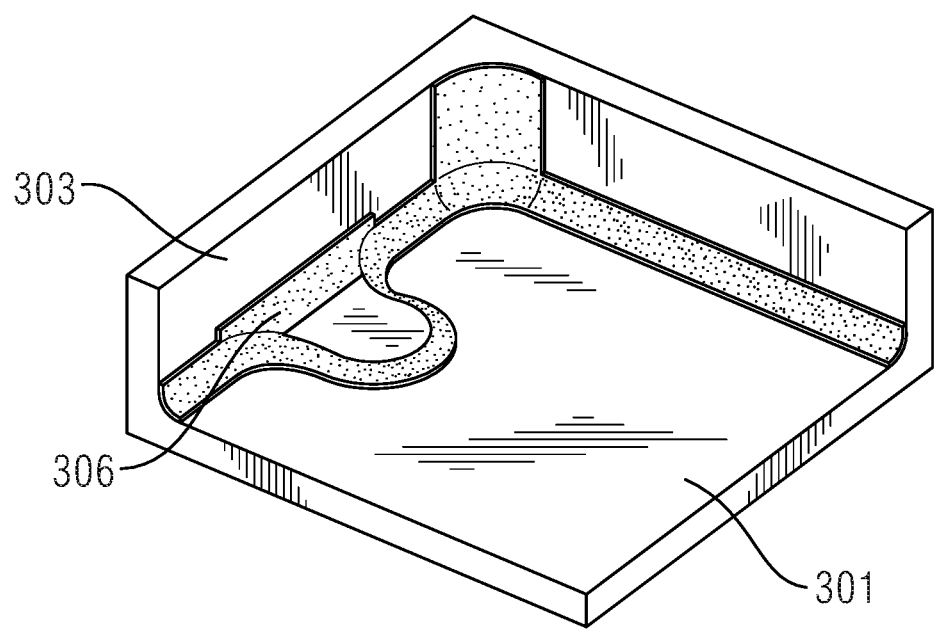

FIGS. 3A-3C illustrate examples of solid-model pockets with an additional feature.

FIG. 3A illustrates a pocket with a wall 303 and a floor boss 302 near the wall 303. Note that there is no blending or other softening of the sharp edges between the base 301 and the wall 303 or the boss 302.

FIG. 3B illustrates a pocket with modeled blends 304 using conventional CAD blending and visualization techniques. In actual manufacturing, again, this blend could be machined only by using a spherical mill. An end mill is the preferred tool for machining a pocket, and if an end mill were used for machining this pocket, it could produce a number of different results.

FIG. 3C illustrates one possible result of machining the pocket of FIG. 3A using an end mill. Note that the resulting manufactured blend 306 is much different than the blend presented using conventional blending and visualization, particularly between the boss and the wall.

Figure 4A:
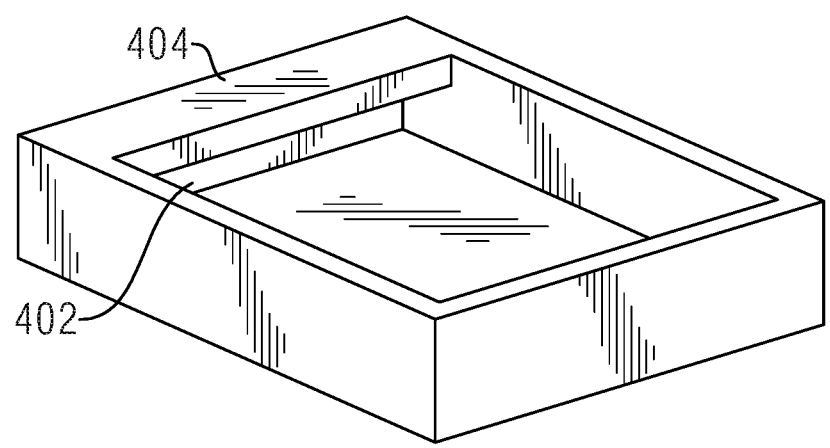
FIGS. 4A-4C illustrate examples of solid-model pockets with an overhang.
Figure 4B:
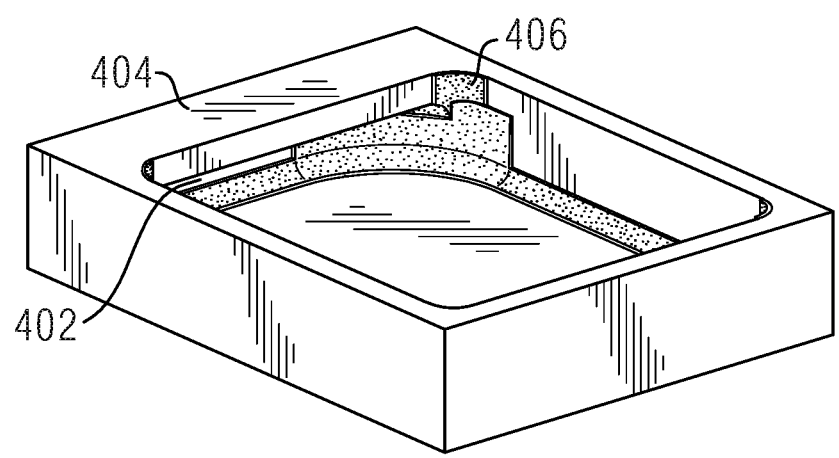
Figure 4C:
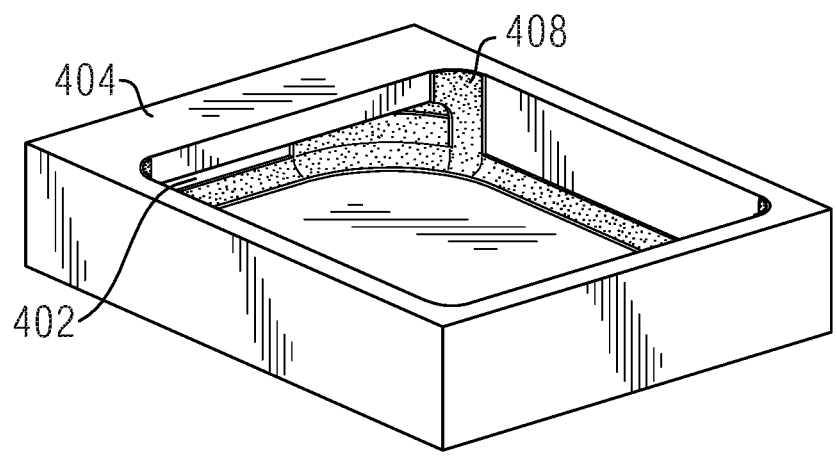

FIGS. 4A-4C illustrate examples of solid-model pockets with an overhang.

FIG. 4A illustrates a pocket with a wall 402 and an overhang 404 extending from the wall 402 (and running between other walls) using conventional CAD blending and visualization techniques. Note that there is no blending or other softening of the sharp edges between the base and the wall 402 or the overhang 404.

FIG. 4B illustrates a pocket with an overhang 404 using conventional CAD blending and visualization techniques. In actual manufacturing, more modeling operations would be necessary to correct the detail 406 at the ends of the overhang 404, for example. Using a T cutter and an end mill, this pocket could not really be machined as shown in FIG. 4B.

FIG. 4C illustrates a pocket with an overhang 404 as would be machined using the correct application of a T cutter and an end mill to machine the pocket. Note the more-accurate blend detail 408.

Figure 5A:
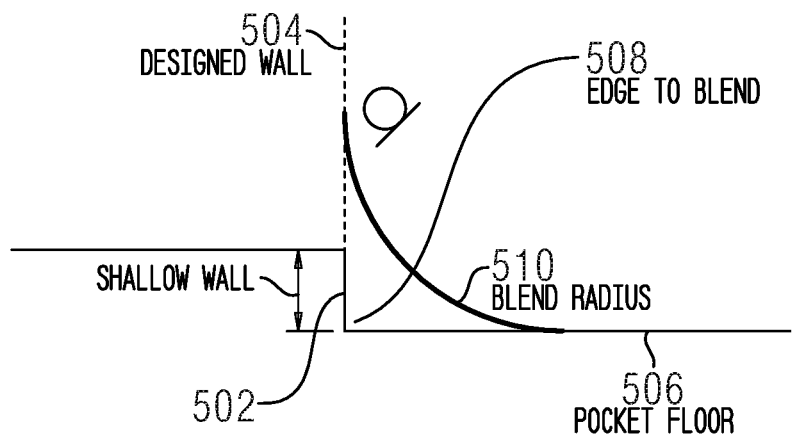
FIGS. 5A-5B illustrate examples of solid-model pockets with a shallow wall.
Figure 5B:
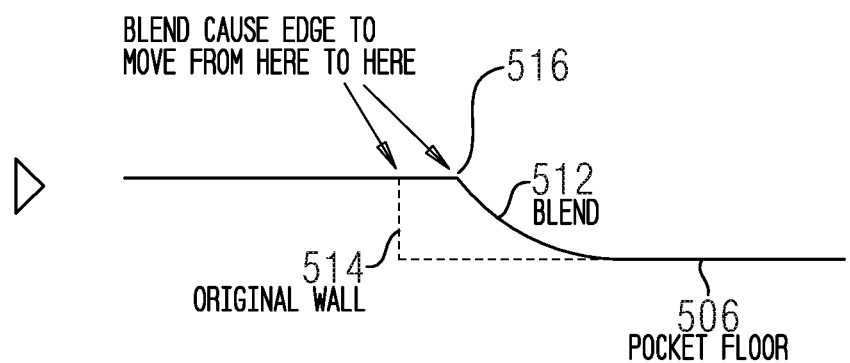

FIGS. 5A-5B illustrate an example of a solid-model pocket with a shallow wall. To form a blend of the edge 508 between the shallow wall 502 and the pocket floor 506, with a given blend radius 510, many systems will extend the wall to meet the blend radius, as shown in FIG. 5B, to reflect a blend with respect to a virtual designed wall 504.

FIG. 5B illustrates that, when blend 512 is machined, it effectively moves the top edge of the original wall at 514 to a new location at 516. The modeled blend could cause the edge to move, thus violating the designed location of the edge. The original location of the edge must be maintained.

The figures described above show just four typical examples of discrepancies that can exist between a blended model of a pocket and the actual physical pocket that is manufactured.

Disclosed embodiments allow the user to identify pocket details that require consideration of machining when blending a pocket so that the system can then model the blends as closely as possible to how they will be created when the pocket is machined.

The system uses an "analyze pockets" process that finds details of which the user needs to be aware when blending the pocket, i.e., undercuts, angled walls, and tool inaccessibility areas. This information is needed for the proper selection of the tools and methods that will be used to machine the pocket. These areas are listed, and indicated graphically, so that the user can easily identify these areas of concern. The information is then used to specify tool types, methods, and tool dimensions for machining, and thus result in accurate blends of the internal edges of the pockets.

Undercuts and acutely angled walls can be found (if specified) regardless of what tool and tool dimensions are specified. Tool inaccessibility areas can include floor bosses, particularly for end mill and spherical mill tools. Tool inaccessibility areas can include undercut height, such as when a T cutter tool is too thick to machine the undercut. Tool inaccessibility areas can include reach, such as whether a T cutter tool diameter and neck diameter are such that the cutter can reach the back wall of the undercut. Tool inaccessibility areas can include access clearance, such as whether a T cutter tool will violate a part wall. Tool inaccessibility areas can include other general access problems where a given tool may not be able to properly machine the blend area.

The system can receive other input to use in the analysis processes described herein. For example, the pocket floor faces (excluding bosses) can be input to the both the blend pocket and analyze pockets processes. Users can specify the final Wall-to-Wall blend radius or a tool diameter and corner clearance. The final blend radius can be produced from the specified tool diameter and the specified corner clearance ($R=D/2+CC$; where R is the radius; D is the diameter; and CC is the corner clearance). If the user does not specify the corner clearance, then the Wall-to-Wall blend radius can be used as the tool radius (the tool diameter divided by 2). However, if the user specifies a corner clearance, then the Wall-to-Wall radius can be designated as the tool diameter divided by 2, plus the corner clearance. The corner clearance is the difference between the desired corner blend radius and the cutting tool radius, and in many cases is actually the radius of the tool path at the corner. The Wall-to-Wall radius generally is not input by the user, but the system can calculate it and present it in the dialog for information.

When pockets overlap, the explicit selection of one floor face can cause the system to also automatically infer the floor faces of the overlapping pockets, and all floor faces can be shown as selected whether they were explicitly selected or inferred. The user will be able to deselect any of the selected floor faces, whether explicitly selected or inferred (because each pocket may require a different tool, even if overlapping).

Upon selection of the floor faces, the system can automatically select wall faces and highlight them, for example in a secondary selection color. If the automatic wall selection is not what the user wants, wall faces can be deselected or added as desired by the user.

The tool to be used for machining, and its dimensions, can be input to any of the processes described herein.

The system uses a "blend pocket" process to model blends on the edges of a pocket by specifying the tool or tools that will be used, how the tool will be applied in some cases, and the tool dimensions. Only "concave" edges will be blended, i.e., edges where blend material is added, not the "convex" edges where material would be removed. As used herein, a "concave" edge is defined as the edge between two faces that have an angle of less than 180° between them at the edge.

Prior to actually blending the pocket, the blend pocket process can compare the specified tool to the dimensions of the pocket to detect and report problem areas, e.g., tool dimensions that are incompatible, areas of the pocket where the tool will not fit, etc. The blend pocket process allows the user to optionally enter a corner clearance dimension so that the tool path will not have to include a sharp turn at a corner.

The system can then blend multiple edges of the pocket in one operation, using minimal geometric input.

The blend pocket process automatically considers tool inaccessibility areas in the pocket. When possible it creates "fill" material in the model as necessary to accurately represent the as-machined state.

The blend pocket process honors design intent by only adding material to create the blends, i.e., never removing material from the model.

The resulting model of the blended pocket will closely or exactly depict the actual pocket as it will be manufactured.

FIG. 6 illustrates a flowchart of a process in accordance with disclosed embodiments that may be performed, for example, by one or more CAD, PLM, or PDM systems (referred to generically herein as "the system").

The system receives a solid model including a plurality of faces (605). "Receiving," as used herein, can include loading from storage, receiving from another device or process, receiving via an interaction with a user, and otherwise. The faces can be part of such features as a wall or a floor of the solid model.

The system identifies a pocket, from the plurality of faces, which includes one or more pocket edges to be blended (610). The system can identify the pocket and display it to a user, or the system can receive a selection of one or more faces, from the user, that identifies the pocket. Typically the pocket has floor faces and wall faces. Many pockets have multiple floor faces and multiple wall faces. Many common pockets will have one floor face and multiple wall faces. As described herein, in some cases, the system can receive a selection of a floor face and automatically identify one or more wall faces that form the pocket. There can be one or more pocket edges which are the edges between, for example, the floor and the walls that form the pocket, and the edges between walls of the pocket.

The system performs an analyze pockets process on the pocket (615) including displaying pocket details to the user. The pocket details can include undercuts, angled walls, or tool inaccessibility areas.

The system can identify tool types, tool methods (how the tool with be used or the machining performed), or tool dimensions for machining the pocket (620). This can be performed automatically by the system, based on the pocket details, or can include receiving corresponding selections from the user.

The system performs a blend pocket process to model blends on the pocket edge(s) (625). This can be performed according to the identified tool types, methods, or tool dimensions. This can include comparing the specified tool to the dimensions of the pocket to detect and report problem areas. This can include receiving a corner clearance dimension so that the tool path will not have to include a sharp turn at a corner.

The system adds blends to the solid model at the pocket edges, according to the blend pocket process, to produce a modified solid model (630).

The system stores or displays the modified solid model (635).

Of course, those of skill in the art will recognize that, unless specifically indicated or required by the sequence of operations, certain steps in the processes described above may be omitted, performed concurrently or sequentially, or performed in a different order.

Blending is generally the most time-consuming activity when modeling a part using CAD. The ability to do it easily and more accurately using disclosed embodiments is a significant enhancement to productivity, among other advantages.

Disclosed embodiments add functionality to CAD systems that analyze a pocket to determine if it has walls with overhangs (i.e., undercut walls), angled walls, and/or areas of tool inaccessibility. Various embodiments add filleting functionality that uses the specification of a tool type, machining method, or tool dimensions to create the blends in a pocket. Disclosed embodiments can blend the internal concave edges of a pocket as they would be created by machining the pocket using a particular type of tool, a specified tool orientation during cutting passes, and specified tool dimensions.

Various embodiments can automatically detect and blend nested pockets.

In some cases, the analyze pocket process can provide dimensional information that can be used to select a tool for the particular pocket(s) analyzed. E.g., "The tool reach of the T Cutter must be greater than 18 mm," or "The flute length of the T Cutter must be less than 24 mm."

In some cases, the system allows the user to select a tool from a standard tool catalog during the drafting process, and can suggest a likely tool or tools to use for the particular pocket selected.

There are cases where pockets are with clusters of bosses and with bosses near pocket walls, it is particularly hard to be blended as would-be-machined. They need to be created in many steps with the correct order. Each step involves careful selection of faces and edges ended up from previous steps. For shallow boss, it needs to change the radial size with proper value before applying the blend so that the boss will have the original size and will have the correct shape after applying the blend. Within the boss cluster or between bosses and walls, if there is enough room, the space cannot be filled by blends in order to add less material.

FIGS. 7A-7E illustrate examples of solid-model pockets with multiple floor bosses and with bosses near pocket walls, wherein like numbers designate like objects.

Figure 7A:
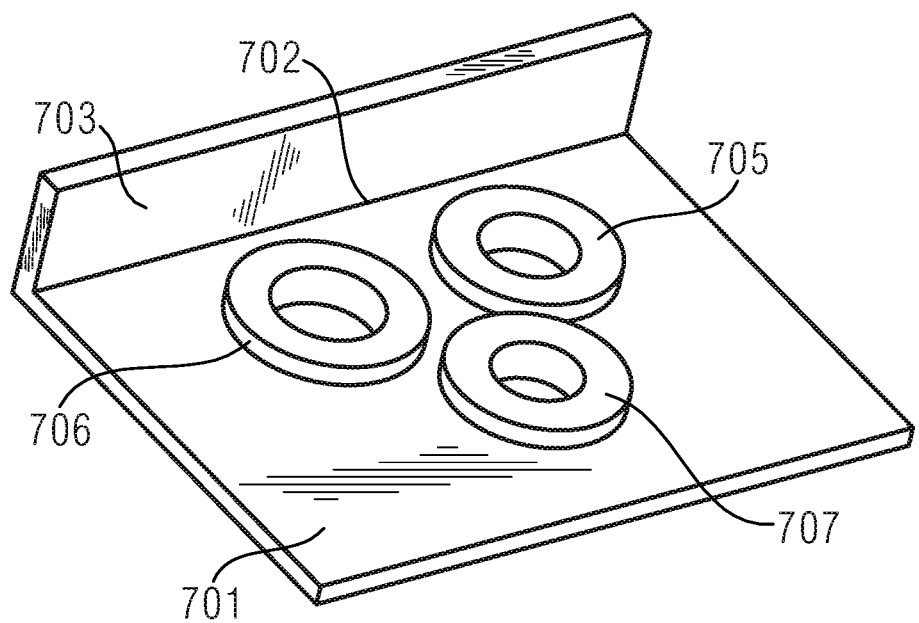
FIGS. 7A-7E illustrate examples of solid-model pockets with multiple floor bosses and with bosses near pocket walls.

FIG. 7A illustrates a pocket with floor faces 701 and wall faces 703, including a cluster of bosses which consist of floor bosses 705, 706, 707. Note that there is no blending or other softening of the edge 702, or within the cluster of bosses 705, 706, 707 or between bosses 705, 706, 707 and faces 701, 703.

Figure 7B:
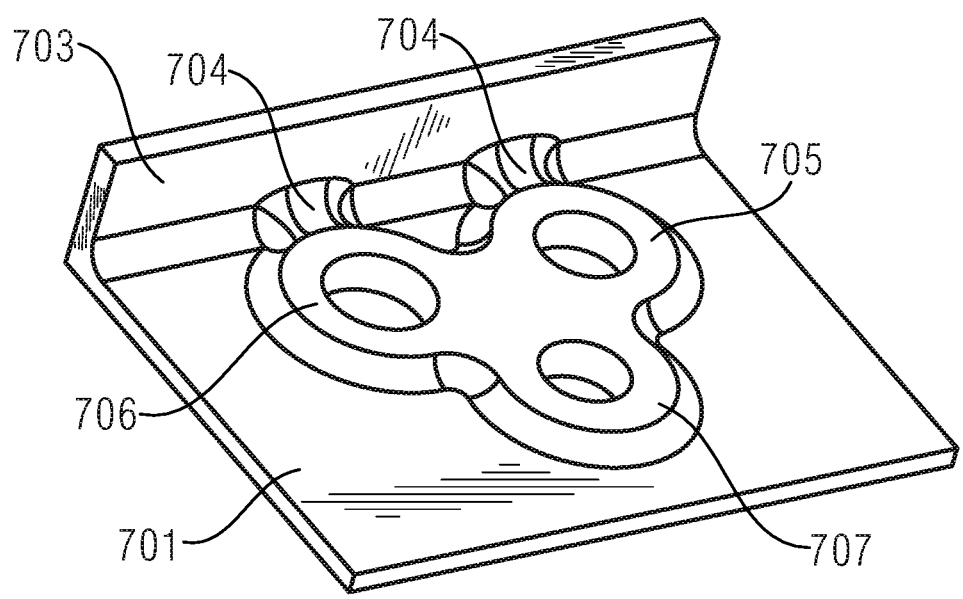

FIG. 7B illustrates a pocket with modeled blend 704 using regular blending and cliff blending, which result in a failure blend or a wrong shape.

Figure 7C:
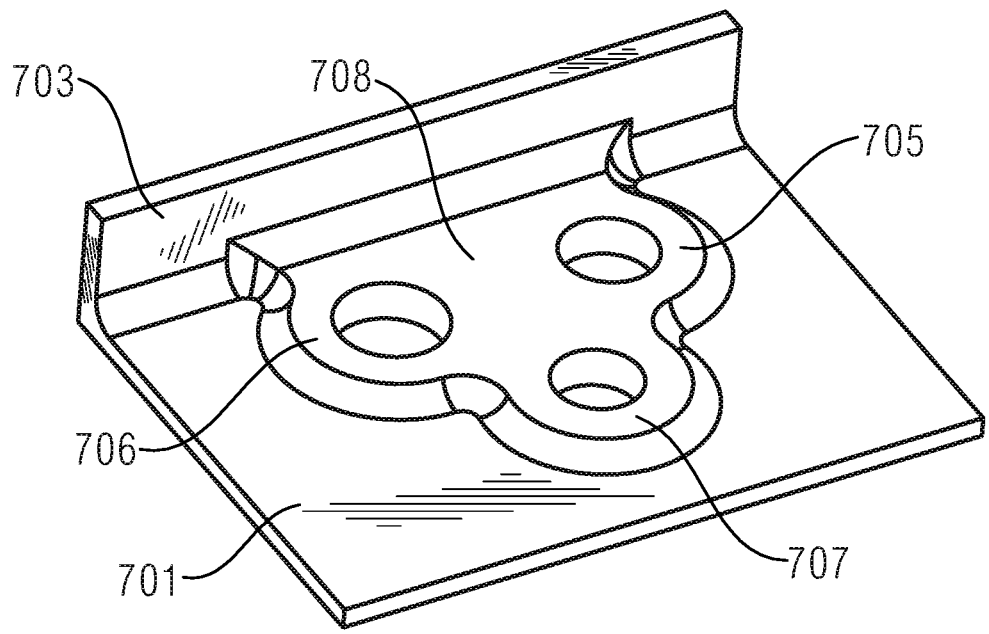

FIG. 7C illustrates a pocket with modeled blends using regular blending and notch blending, which is an unintended result where region 708 being incorrectly filled.

Figure 7D:
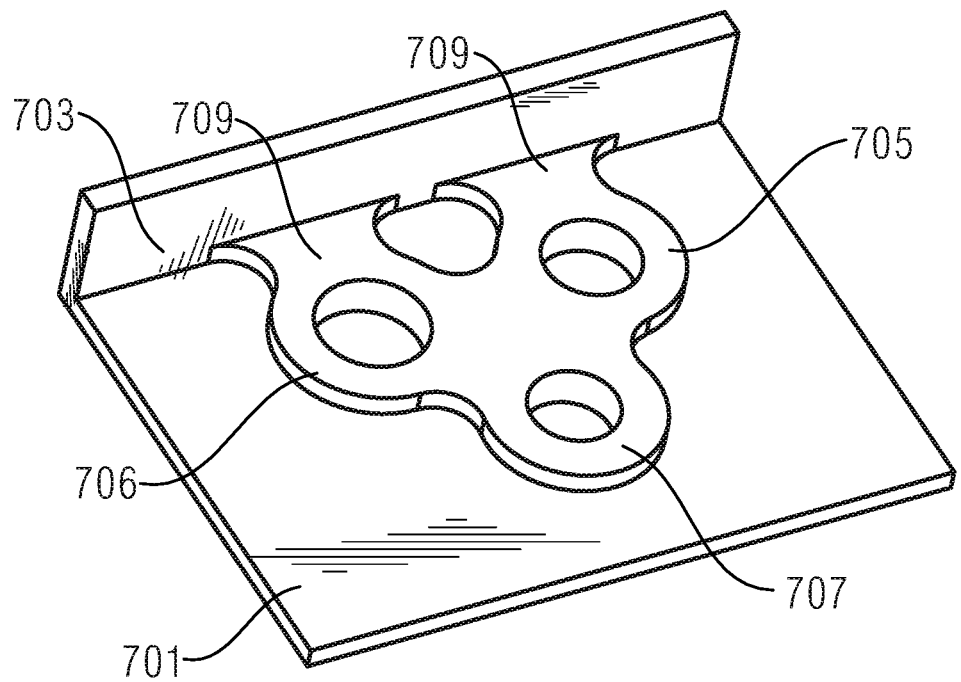

FIG. 7D illustrates a pocket with modeled blends 709 using regular blending and notch blending, which result in partial blends results. Note that there is no blending or other softening between bosses 705, 706, 707 and floor face 701.

Figure 7E:
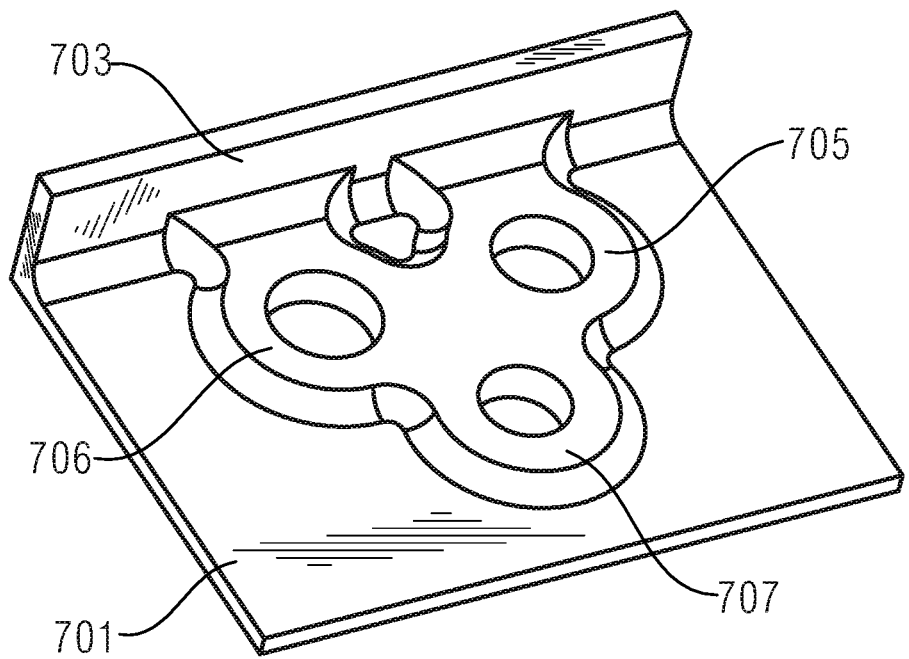

FIG. 7E illustrates a pocket with modeled blends as expected.

The system enables users to accurately and automatically model all would-be-machined blends in one step for such cases where clusters of bosses being associated with multiple walls in a solid model pocket.

FIGS. 8A-8E illustrate an example for modeling all would-be-machined blends for a solid model pocket including clusters of bosses and multiple wall faces, wherein like numbers designate like objects.

Figure 8A:
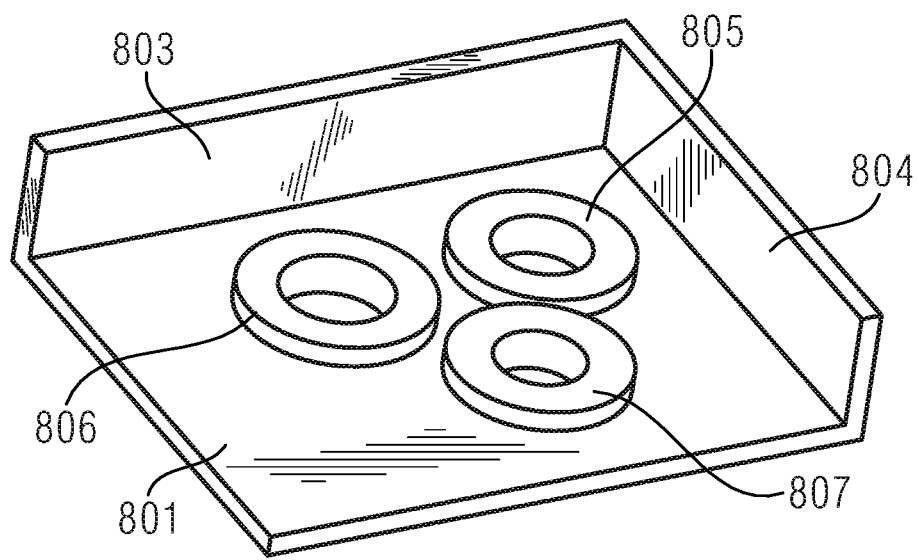
FIGS. 8A-8E illustrate an example for modeling all would-be-machined blends for a solid model pocket including clusters of bosses and multiple wall faces.

FIG. 8A illustrates a pocket including tangentially connected set of floor faces 801. The system recognizes wall faces 803, 804 of the pocket and the bosses 805, 806, 807 in the pocket automatically.

The system inputs the blend radius between the bosses 805, 806, 807, between the wall faces 803, 804 and between the wall faces 803, 804 and the bosses 805, 806, 807. In machining term, it is half of the diameter of the end mill.

The system inputs the blend radius between the bosses 805, 806, 807 and the floor faces 801, and between the wall faces 803, 804 and the floor faces 801. In machining term, it is the lower radius of the end mill. If the height of a boss or a wall face is smaller than the lower blend radius, the system offsets the side face of the boss or the wall face with the properly computed value such that the boss edge will remain at the same position after the lower blends are applied later.

The system then orders the wall faces 803, 804 based on their orientation to a global reference, in this case the wall face 803 is ordered to be the first wall face while wall face 804 being the second wall face.

Bosses 805, 806, 807 are grouped into sets. In each set, one boss is closer to at least another boss than the blend diameter. For each boss set, the system finds the boss that is farthest to the first wall face 803.

Figure 8B:
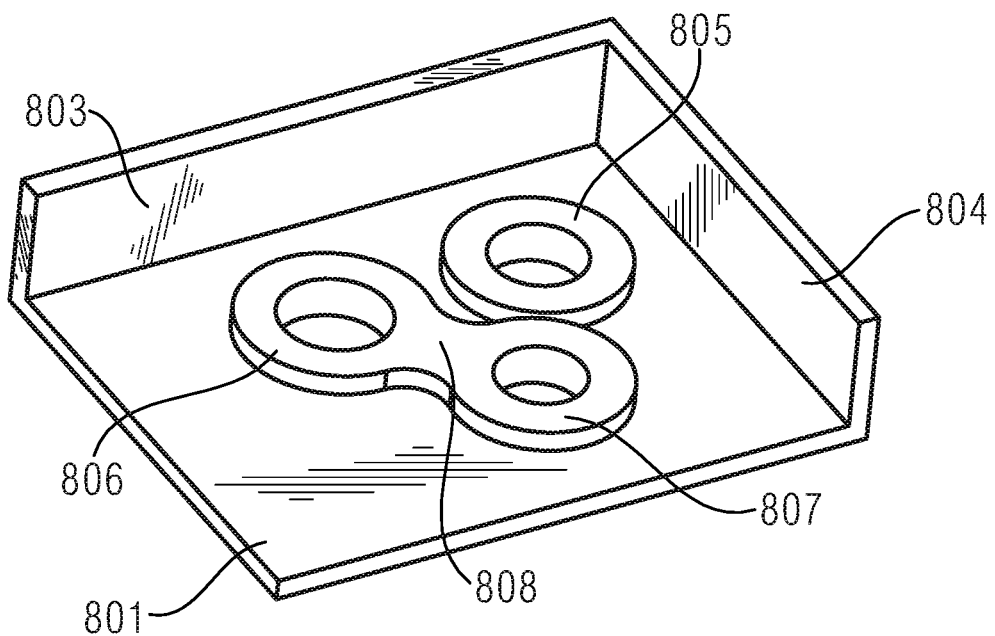
Figure 8C:
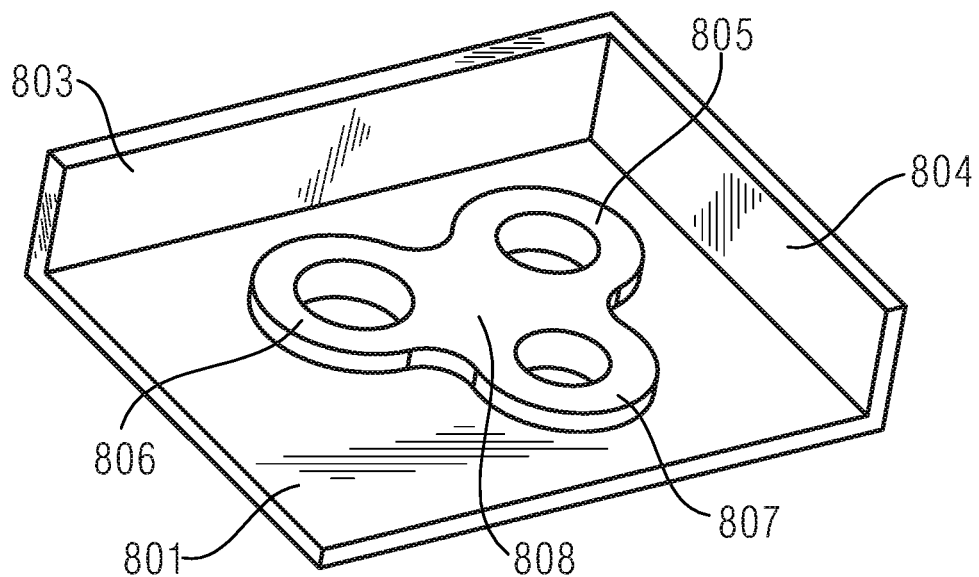

As illustrated in FIG. 8B, the system creates face to face blends 808 between the side faces of the farthest boss 807 and the boss 806 that is closest to it. The system then creates face to face blends between the boss cluster combined by the previous blends and a remaining boss 805 in the set. This next boss 805 is the closest, among all remaining bosses, to the boss cluster. In the boss cluster, only the side faces of original bosses that are closer than the blend diameter to the next boss are used as the blend construction faces while new blend faces are excluded. The system repeats such steps until all bosses in the set are processed, as illustrated in FIG. 8C.

Figure 8D:
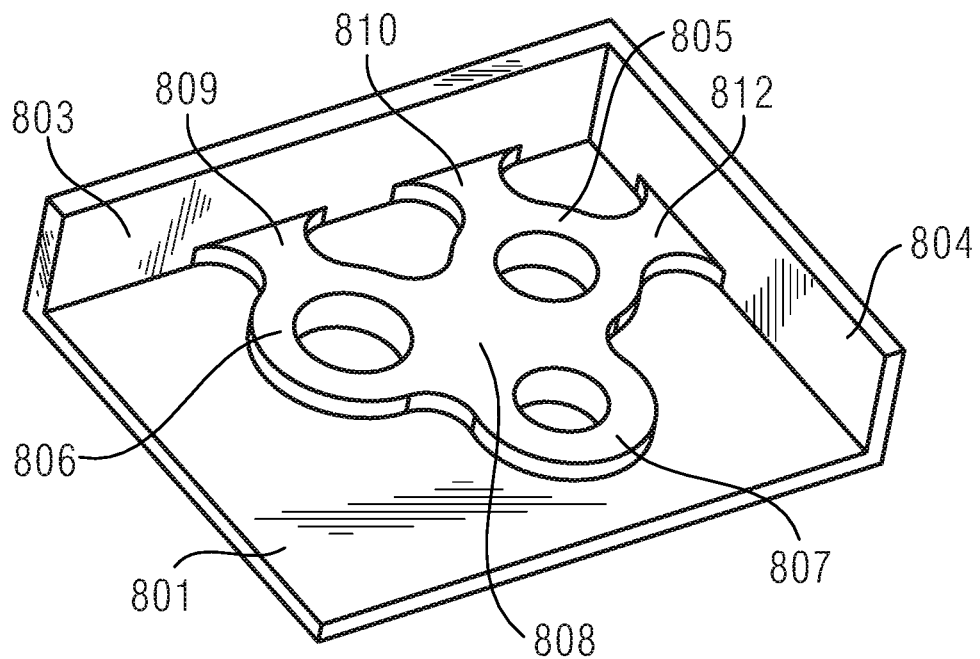

As illustrated in FIG. 8D, for each wall faces 803, 804, the systems identifies all side faces of the original bosses that are closer to the wall faces than the blend diameter, and then orders the bosses that have such side faces along the direction from one side of the wall faces to the other side, in this case, from the first wall face 803 to the second wall face 804. Based on the wall faces orders and for each wall face based on the boss order in previous step, the system creates face to face blend 809 between the first wall face 803 and the boss. The system then repeat such steps until all face to face blends 809, 810 between all bosses to the first wall face 803 are created, and then apply similar steps for the second wall face 804, where face to face blend 812 between all bosses to the second wall face 804 is created.

Figure 8E:
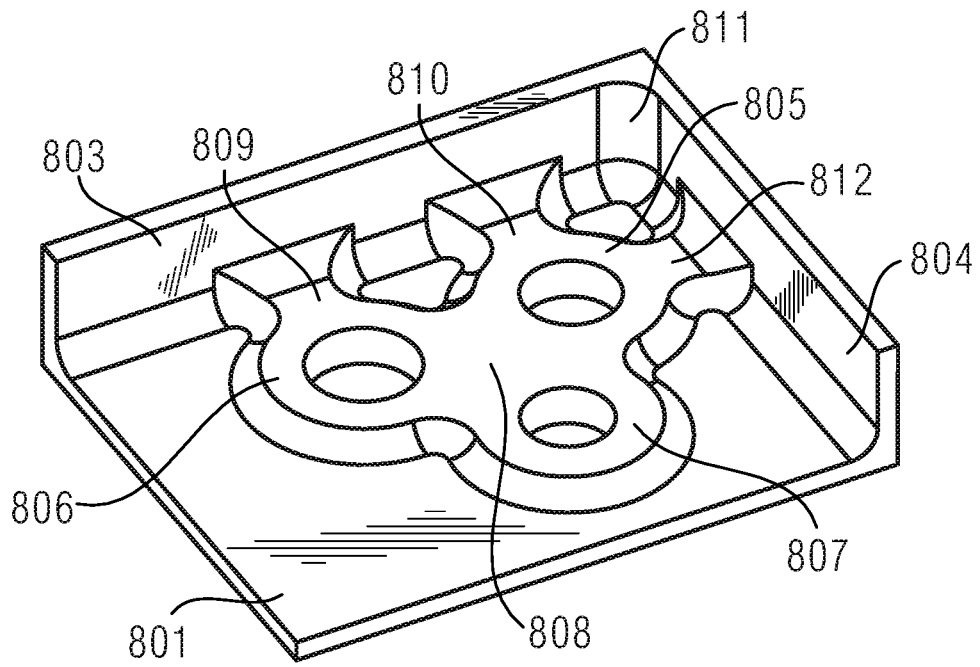

As illustrated in FIG. 8E, the system creates edge blends 811 between adjacent wall faces 803, 804. The system then finds all the intersection edges between the floor faces 801 and the boss cluster, and between the floor faces 801 and all wall faces 803, 804, and configures them into connected sets of edges. For each connected set of edges, the system creates notch blends at them.

The system then enables the user to create all would-be-machined blends among multiple bosses, between the bosses and one adjacent wall, between the bosses and the floor faces, and between the wall faces and the floor faces of the pocket in a solid model in one operation.

The system then enables the user to create all would-be-machined blends between one boss and multiple adjacent wall faces, between the wall faces, between the bosses and the floor faces, and between the wall faces and the floor faces of the pocket in a solid model in one operation.

The system then enables the user to create all would-be-machined blends among multiple bosses, between the bosses and multiple adjacent wall faces, between the wall faces, between the bosses and the floor faces, and between the wall faces and the floor faces of the pocket in a solid model in one operation.

The radial size of a boss is preserved after the blending even when the blend radius is larger than the height of the boss.

When the size of the space among the bosses and wall faces is larger than the diameter of the lower blend, the space will not be filled by the blend.

The above also works when the bosses have different radial sizes and heights.

The above also works when combining with the angled wall case, the overhang case and the shallow wall cases.

The system enables users to accurately model all would-be-machined blends for the category of boss clusters associated with multiple wall faces in a solid model pocket in one step, that otherwise will fail, get a wrong result, or take 10-20 steps of manual attempts, among numerous other disadvantages. It significantly improves the productivity and increases the success rate for manufacturers, among numerous other advantages.

The system achieves automatically detecting geometry relations among bosses and wall faces of a pocket, it automatically blends bosses and wall faces step by step in correct order. In each step, it automatically picks the right faces and edges resulted from previous steps, and it automatically computes the dimension value that needs to be adjusted for shallow bosses and adjust the model before applying side blends on pads.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph "f" of 35 USC § 112 unless the exact words "means for" are followed by a participle.

What is claimed is:

1. A method for accurately modeling blends in a solid model, the method performed by a data processing system and comprising:
receiving a solid model including a plurality of faces and bosses, by the data processing system, the plurality of faces including wall faces;
identifying a pocket from the plurality of faces, by the data processing system, including pocket edges to be blended;
determining, by a processor, a predefined order of the pocket edges to be blended, the determining of the predefined order of the pocket edges to be blended comprising ordering the wall faces based on orientations relative to a global reference, respectively, and ordering at least some of the pocket edges based on the ordering of the wall faces; and
performing an analyze pockets process on the pocket by the data processing system;
identifying at least one of a tool type, a tool method, or a tool dimension for machining the pocket, by the data processing system;
performing a blend pocket process, by the data processing system, to model blends on the pocket edges;
adding blends to the solid model at the pocket edges in the predefined order, by the data processing system and according to the blend pocket process, such that a first of the blends is added to the solid model at a first of the pocket edges before a second of the blends is added to the solid model at a second of the pocket edges according to the predefined order, to produce a modified solid model; and
displaying, by a display, the modified solid model by the data processing system,
wherein the blend pocket process includes comparing an identified tool type and tool dimension to a dimension of the pocket to detect and report problem areas, such that a discrepancy between an actual pocket as will be manufactured and the pocket of the modified solid model is reducible.

2. The method of claim 1, wherein the pocket edges include edges between bosses and wall faces, edges between adjacent wall faces, edges between wall face and floor face, and edges between bosses and floor face, of the solid model.

3. The method of claim 1, wherein the blend pocket process is performed according to the identified tool type, tool method, or tool dimension.

4. The method of claim 1, wherein the blend pocket process includes comparing the identified tool type and tool dimension to the dimension of the pocket to group the bosses into sets, and blends are added among bosses within each set.

5. The method of claim 4, wherein blends are added in the predefined order comprising adding blends:
a) among the boss sets;
b) between the boss sets and the wall faces;
c) between adjacent wall faces;
d) between wall faces and the top faces of the boss sets; and
e) between floor faces and boss sets, and between floor faces and wall faces.

6. The method of claim 1, wherein the blend pocket process is performed according to a corner clearance dimension.

7. A data processing system comprising:
a processor; and
an accessible memory,
wherein the processor is configured to:
receive a solid model including a plurality of faces and bosses, the plurality of faces including wall faces;
identify a pocket from the plurality of faces, including pocket edges to be blended;
determine a predefined order of the pocket edges to be blended, the determination of the predefined order of the pocket edges to be blended comprising order of the wall faces based on orientations relative to a global reference, respectively, and order of at least some of the pocket edges based on the order of the wall faces; and
perform an analyze pockets process on the pocket;
identify at least one of a tool type, a tool method, or a tool dimension for machining the pocket;
perform a blend pocket process to model blends on the pocket edges; and
add the blends to the solid model at the pocket edges in the predefined order, according to the blend pocket process, such that a first of the blends is added to the solid model at a first of the pocket edges before a second of the blends is added to the solid model at a second of the pocket edges according to the predefined order, to produce a modified solid model; and
a display configured to display the modified solid model,
wherein the blend pocket process includes a comparison of an identified tool type and tool dimension to a dimension of the pocket to detect and report problem areas, such that a discrepancy between an actual pocket as will be manufactured and the pocket of the modified solid model is reducible.

8. The data processing system of claim 7, wherein the pocket edges include edges between bosses and wall faces, edges between adjacent wall faces, edges between wall face and floor face, and edges between bosses and floor face, of the solid model.

9. The data processing system of claim 7, wherein the blend pocket process is performed according to the identified tool type, tool method, or tool dimension.

10. The data processing system of claim 7, wherein the blend pocket process includes comparing the identified tool type and tool dimension to the dimension of the pocket to group the bosses into sets, and blends are added among bosses within each set.

11. The data processing system of claim 10, wherein blends are added in the predefined order comprising adding blends:
a) among the boss sets;
b) between the boss sets and the wall faces;
c) between adjacent wall faces;
d) between wall faces and the top faces of the boss sets; and
e) between floor faces and boss sets, and between floor faces and wall faces.

12. The data processing system of claim 7, wherein the blend pocket process is performed according to a corner clearance dimension.

13. A non-transitory computer-readable medium encoded with executable instructions that, when executed, cause one or more data processing systems to:
receive a solid model including a plurality of faces and bosses, the plurality of faces including wall faces;
identify a pocket from the plurality of faces, including pocket edges to be blended;
determine, by a processor, a predefined order of the pocket edges to be blended, the determination of the predefined order of the pocket edges to be blended comprising order of the wall faces based on orientations relative to a global reference, respectively, and order of at least some of the pocket edges based on the order of the wall faces; and perform an analyze pockets process on the pocket;

identify at least one of a tool type, a tool method, or a tool dimension for machining the pocket;

perform a blend pocket process to model blends on the pocket edges;

add the blends to the solid model at the pocket edges in the predefined order, according to the blend pocket process, such that a first of the blends is added to the solid model at a first of the pocket edges before a second of the blends is added to the solid model at a second of the pocket edges according to the predefined order, to produce a modified solid model; and display, by a display, the modified solid model, wherein the blend pocket process includes a comparison of an identified tool type and tool dimension to a dimension of the pocket to detect and report problem areas, such that a discrepancy between an actual pocket as will be manufactured and the pocket of the modified solid model is reducible.

14. The computer-readable medium of claim 13, wherein the pocket edges include edges between bosses and wall faces, edges between adjacent wall faces, edges between wall face and floor face, and edges between bosses and floor face, of the solid model.

15. The computer-readable medium of claim 13, wherein the blend pocket process is performed according to the identified tool type, tool method, or tool dimension.

16. The computer-readable medium of claim 13, wherein the blend pocket process includes comparing the identified tool type and tool dimension to the dimension of the pocket to group the bosses into sets.

17. The computer-readable medium of claim 16, wherein blends are added among bosses within each set, and blends are added in the predefined order comprising adding blends:
 a) among the boss sets;
 b) between the boss sets and the wall faces;
 c) between adjacent wall faces;
 d) between wall faces and the top faces of the boss sets; and
 e) between floor faces and boss sets, and between floor faces and wall faces.

18. The computer-readable medium of claim 13, wherein the blend pocket process is performed according to a corner clearance dimension.

* * * * *